United States Patent
Zhou et al.

(10) Patent No.: US 11,225,613 B2
(45) Date of Patent: Jan. 18, 2022

(54) PROCESS FOR REMOVING SULFUR COMPOUNDS FROM A LIQUID COMPOSITION

(71) Applicant: SOLVAY SA, Brussels (BE)

(72) Inventors: Wenjuan Zhou, Shanghai (CN); Armin Liebens, Shanghai (CN); Pierre Dournel, Brussels (BE); Andrew Willson, Tervuren (BE)

(73) Assignee: Solvay SA, Brussels (BE)

( * ) Notice: Subject to any disclaimer, the term of this patent is extended or adjusted under 35 U.S.C. 154(b) by 159 days.

(21) Appl. No.: 16/610,174

(22) PCT Filed: May 8, 2017

(86) PCT No.: PCT/CN2017/083514
§ 371 (c)(1),
(2) Date: Nov. 1, 2019

(87) PCT Pub. No.: WO2018/205113
PCT Pub. Date: Nov. 15, 2018

(65) Prior Publication Data
US 2020/0056103 A1  Feb. 20, 2020

(51) Int. Cl.
*C10G 27/10* (2006.01)

(52) U.S. Cl.
CPC ....... *C10G 27/10* (2013.01); *C10G 2300/104* (2013.01); *C10G 2300/202* (2013.01); *C10G 2400/02* (2013.01)

(58) Field of Classification Search
CPC .............. C10G 27/10; C10G 2300/104; C10G 2300/202; C10G 2400/02; B01J 27/188
See application file for complete search history.

(56) References Cited

U.S. PATENT DOCUMENTS

| | | | |
|---|---|---|---|
| 9,388,346 B2 * | 7/2016 | Neumann | C10G 29/06 |
| 2005/0150819 A1 * | 7/2005 | Wachs | C10G 27/04 |
| | | | 208/208 R |
| 2007/0178033 A1 | 8/2007 | DeAngelis et al. | |
| 2010/0300938 A1 * | 12/2010 | Martinie | C10G 27/00 |
| | | | 208/236 |

FOREIGN PATENT DOCUMENTS

| | | | |
|---|---|---|---|
| CN | 103285923 A | | 9/2013 |
| CN | 104001544 | * | 8/2014 |
| CN | 104001544 A | | 8/2014 |
| CN | 104592119 A | | 5/2015 |
| CN | 105689003 A | | 6/2016 |
| CN | 106318439 A | | 1/2017 |
| JP | 2008169297 A | | 7/2008 |

* cited by examiner

*Primary Examiner* — Randy Boyer
*Assistant Examiner* — Juan C Valencia
(74) *Attorney, Agent, or Firm* — Osha Bergman Watanabe & Burton LLP

(57) ABSTRACT

A process for removing sulfur compounds from a liquid composition immiscible with water, comprising at least partially oxidizing the sulfur compounds by contacting a liquid composition comprising at least one sulfur compound with an aqueous oxidizing solution comprising at least one oxidant in the presence of at least one polyoxometalate and amphiphilic solid particles.

20 Claims, No Drawings

PROCESS FOR REMOVING SULFUR COMPOUNDS FROM A LIQUID COMPOSITION

This application is a U.S. national stage entry under 35 U.S.C. § 371 of International Application No. PCT/CN2017/083514 filed 8 May 2017. The entire content of this application is hereby incorporated herein by reference.

The present invention concerns an oxidative desulfurization process (ODS) performed in the presence of polyoxometalate and amphiphilic solid particles.

PRIOR ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Deep desulfurization of gasoline has been attracting much attention in the past few years. It is well known that removing the refractory sulfur compounds, such as benzothiophene (BT), dibenzothiophene (DBT) and its derivatives by means of hydrodesulfurization (HDS) process. Oxidative desulfurization with polyoxometalate/$H_2O_2$ in a catalytic emulsion system is considered as one of the promising processes to deeply remove sulfur compounds, especially organic sulfur compounds.

Can Li, et al. Topics in Catalysis (2005), 35(1-2), 169-175 discloses a catalyst assembled in emulsions. The catalysts composed of polyoxometalate anions and quaternary ammonium cations. Ge Jianhua, et al. China Petroleum Processing and Petrochemical Technology (2012), 14(1), 25-31 reports a catalytic method for oxidative Desulfurization of gasoline using vanadium (V)-substituted polyoxometalate/$H_2O_2$/ionic liquid emulsion system. However, the emulsifiers used in those prior arts are difficult to be reused and recycled since they are in the liquid form or have to be dissolved in a solvent.

Zijiang Jiang, et al. Applied Catalysis, A: General (2013), 467, 26-32 reports a surfactant polyoxometalate compound $[C_{16}H_{33}(CH_3)_2NOH]_3\{PO_4[WO(O_2)_2]_4\}$ was encapsulated in the channels of silica to compose a micro reaction-controlled phase-transfer system for efficient oxidative desulfurization. Lucie S. Nogueira, et al. Dalton Trans., 2014, 43, 9518-9528 also reports silica nano-sized particles incorporating polyoxometalates, which were developed to an efficient heterogeneous oxidative catalyst. Specifically, Zinc-substituted polyoxotungstate was encapsulated into silica nanoparticles using a cross-linked organic-inorganic core, performed through successive spontaneous reactions in water.

Chen Yang, et al. Applied Catalysis, A General (2013), 466, 307-314 provides a micro reaction-controlled phase-transfer catalyst. According to this technology, lanthanide-containing polyoxometalate of $Na_7H_2LaW_{10}O_{36} \cdot 32H_2O$ ($LaW_{10}$) is chemically anchored to the amino-modified mesoporous silica through an organic linker.

Meng Li, et al. Journal of Molecular Catalysis A: Chemical (2015), 406, 23-30 teaches an attractive oxidative desulfurization process (ODS), in which amphiphilic polyoxometalate-based supported silica $[C_4mim]_3PW_{12}O_{40}/SiO_2$ was successfully synthesized by a facile hydrothermal process and employed in ODS process. The proposed mechanism demonstrates that the POM-based iron liquids are embedded into the silica matrix uniformly and maintained the structure integrity. The amphiphilic hybrid catalysts also have pretty good recycle capability. Nevertheless, the preparation of catalyst is very complicated.

As such, there remains a need to develop a novel process for removing sulfur compounds from a liquid composition, notably hydrocarbon fuels, which features a more simple catalytic system, low cost and easy recycling of emulsifiers.

INVENTION

The present invention therefore pertains to a process for removing sulfur compounds from a liquid composition immiscible with water, comprising at least partially oxidizing the sulfur compounds by contacting a liquid composition comprising at least one sulfur compound with an aqueous oxidizing solution comprising at least one oxidant in the presence of at least one polyoxometalate and amphiphilic solid particles.

The invention also concerns a composition comprising:
a) a liquid composition immiscible with water comprising at least one sulfur compound;
b) at least one polyoxometalate and amphiphilic solid particles;
c) an aqueous oxidizing solution comprising at least one oxidant.

From our previous work, we have found that it is possible to removing sulfur compounds from a liquid composition, notably hydrocarbon fuels, using a specific Pickering emulsion condition (emulsion stabilized by solid particles which adsorb onto the interface between the two phases). Emulsion stabilized by particles are reported since early 20th century, it is also known as Pickering emulsion known since Pickering, S. U. 1907, J. Chem. Soc. 91 Pages 2001-2021. Aveyard et al. published a review in Advances in Colloid and Interface Science 100-102 (2003) 503-546. Unlike any prior arts above mentioned, there is no linkage between polyoxometalate and solid particles especially by any organic linker. It is also not necessary to take additional steps to combine polyoxometalate and solid particles, such as having polyoxometalate encapsulated in the channels of solid particles or supported on solid particles. While this newly discovered process can advantageously form an emulsion system that is more efficient for oxidative desulfurization process (ODS), conveniently separate, reuse and recycle the emulsifier and economically use less oxidant.

Other characteristics, details and advantages of the invention will emerge more fully upon reading the description which follows.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The term "and/or" includes the meanings "and", "or" and also all the other possible combinations of the elements connected to this term.

Throughout the description, including the claims, the term "comprising one" should be understood as being synonymous with the term "comprising at least one", unless otherwise specified, and "between" should be understood as being inclusive of the limits.

It should be noted that in specifying any range of concentration, any particular upper concentration can be associated with any particular lower concentration.

It is specified that, in the continuation of the description, unless otherwise indicated, the values at the limits are included in the ranges of values which are given.

A "hydrophilic" molecule or portion of a molecule is one that has a tendency to interact with or be dissolved by water and other polar substances.

A "hydrophobic" molecule or portion of a molecule is one that is repelled from a mass of water and other polar substances.

"Amphiphilic" is a term describing a chemical compound possessing both hydrophilic and hydrophobic properties. Such a compound is called amphiphilic or amphipathic.

An "emulsion" is a suspension made of a first liquid in a phase made of a second liquid with which the first liquid is not miscible with the second liquid. A discontinuous phase within a continuous phase is then obtained.

An "emulsifier" is a compound or substance at acts as a stabilizer for emulsions preventing the liquids from separating.

As used herein, polyoxometalate is a polyatomic ion, usually an anion, that consists of three or more transition metal, lanthanide metal or actinide metal oxyanions linked together by shared oxygen atoms to form closed 3-dimensional frameworks.

As used herein, metals of group IB, IIB, IIIB, IVB, VB, VIB, VIIB and VIIIB are often referred to as transition metals. This group comprises the elements with atomic number 21 to 30 (Sc to Zn), 39 to 48 (Y to Cd), 72 to 80 (Hf to Hg) and 104 to 112 (Rf to Cn).

As used herein, the lanthanides encompass the metals with atomic number 57 to 71 and the actinides encompass the metals with the atomic number 89 to 103.

Should the disclosure of any patents, patent applications, and publications which are incorporated herein by reference conflict with the description of the present application to the extent that it may render a term unclear, the present description shall take precedence.

DETAILS OF THE INVENTION

The present invention provides a process for removing sulfur compounds from a liquid composition immiscible with water, comprising at least partially oxidizing the sulfur compounds by contacting a liquid composition comprising at least one sulfur compound with an aqueous oxidizing solution comprising at least one oxidant in the presence of at least one polyoxometalate and amphiphilic solid particles.

The liquid composition of present invention may be a composition in liquid form, which comprises at least one sulfur compound, at least one sulfur-free organic compound and optionally at least one inorganic compound.

Said sulfur compound should have reducing property and could be oxidized by a specific oxidant. It could be inorganic or organic compound and preferably organic sulfur compound.

Said sulfur-free organic compound could notably be hydrocarbon. A hydrocarbon is an organic compound consisting entirely of hydrogen and carbon.

Said inorganic compound does not include $H_2O$ and may notably be some inorganic acids, inorganic bases and inorganic salts as long as their presence does not prevent the oxidation reaction of sulfur compounds.

Preferably, the composition may comprise at least one organic sulfur compound and hydrocarbons. Preferred examples of liquid composition might be fuel oils, such as natural gas condensates, diesel oil, light oils, gasoline, petroleum, kerosene and jet fuel.

The organic sulfur compound comprised in the composition is not particularly limited and depends on the source. Preferably, it could be chosen in the group consisting of benzothiophene (BT), dibenzothiophene (DBT) and alkyl substituted benzothiophenes, such as 4,6-dimethyldibenzothiophene (4,6-DMDBT), thiophenol, methyl sulfide, carbon disulfide, ethylmethyl sulfide, dimethyl disulfide, diethyl disulfide, n-butyl sulfide, n-dibutyl disulfide, phenyl sulfide, thiophene, 2-methyl-thiophene, 3-methyl-thiophene, tetrahydro thiophene, 2-ethyl-thiophene, dimethyl thiophene, 3-ethyl-thiophene, trimethyl thiophene, tetramethyl thiophene, methylbenzothiophene, dimethylbenzothiophene, phenylthiophene, trimethylbenzothiophene, tetramethylbenzothiophene, methyldibenzothiophene, ethyldibenzothiophene, dimethyldibenzothiophene, trimethyldibenzothiophene.

In a preferred embodiment, the organic sulfur compound comprised in the composition may notably be thiophenes, such as benzothiophene (BT), dibenzothiophene (DBT) or 4,6-dimethyldibenzothiophene (4,6-DMDBT) and oxidized to sulfones by invented process.

The amount of sulfur element comprised in liquid composition may be comprised from 50 to 5000 ppm and preferably from 500 to 2000 ppm.

The amphiphilic solid particles of the instant invention may notably be particles having an average diameter comprised from 2 to 5000 nm, preferably from 100 to 3000 nm.

The average diameter of particles can be determined by examining a micrograph of a transmission electron microscopy "TEM" image, measuring the diameter of the particles in the image, and calculating the number average particle size of the measured particles based on magnification of the TEM image. One of ordinary skill in the art will understand how to prepare such a TEM image and determine the particle size based on the magnification. For example, silica particles could be characterized by TEM on a JEOL JEM 2100 microscope operated at 200 kV and equipped with Energy Dispersive Spectroscopy (EDS). The particles to be measured refer to the projection (2D-representation) of the particles on the micrograph. Before performing the measurements, it is necessary to calibrate the image. Size distribution histograms are then plotted as percent silica particles versus silica diameter on the basis of the size measurements obtained from an image processing program, such as ImageJ. The number average is obtained by weighted average method. The measurement should be made on a sufficiently high number of particles, for example at least about 100 particles, preferably at least 300 particles, more preferably at least 1000 particles, still more preferably at least 3000 particles.

The shape or morphology of the amphiphilic solid particle can vary. For example, generally spherical morphologies can be used, as well as particles that are cubic, platy, or acicular (elongated or fibrous), such as sticks or needles.

Solid particles of the invention are amphiphilic and then comprise solid particles having both hydrophilic and hydrophobic functions. Any amphiphilic solid particles that act as a stabilizer to emulsion may be used in the present invention.

Suitable amphiphilic particles include, for example, inorganic materials, such as water immiscible metal salts or metal hydroxides or metal oxides or mixed metal oxides or clays. Specific non-limiting examples include bentonite, tin oxide, magnesium aluminum silicate, magnesium oxide, titanium oxide, barium sulphate or silicon dioxide, such as is described in U.S. Pat. No. 4,833,060 at col. 4, lines 54-61, the cited portion of which being incorporated herein by reference, and alumina as described in United States Patent Application Publication 2005/0156340.

Said amphiphilic solid particles are notably inorganics such as for example made of an oxide, hydroxide or oxy-hydroxide of at least one element chosen from lanthanides, such as cerium, post-transition metals, such as aluminium, transition metals, such as titanium and metalloids, such as silicon.

Some of the elements encompassed by the description above and understood to be metals for the purpose of the present invention, are sometimes also referred to as metalloids. The term metalloid is generally designating an element which has properties between those of metals and non-metals. Typically, metalloids have a metallic appearance but are relatively brittle and have a moderate electrical conductivity. The six commonly recognized metalloids are boron, silicon, germanium, arsenic, antimony, and tellurium.

It can be advantageous that the amphiphilic solid particles of the invention may have a colloidal behaviour, preferably with an inter particular agglomeration rate (number of agglomerated particles/total number of particles) inferior or equal to 5%, more preferably inferior or equal to 2%. In certain embodiments, the solid particles, such as silica and/or alumina particles, are introduced in the form of colloidal dispersion, wherein finely divided solid particles are dispersed within a continuous medium in a manner that prevents them from being filtered easily or settled rapidly. Preferably, the amphiphilic solid particle is silicon dioxide.

Amphiphilic solid particles can also be organic, obtained from reticulation of polymer chains such as latex particles, polymeric particles with core-shell structures which are composed by amphiphilic chains cross-linked at the core or on the layer of shell.

In a preferred embodiment, amphiphilic solid particles can also be particles linked with hydrophilic and hydrophobic functional groups. The particles linked with hydrophilic and hydrophobic functional groups could have or haven't amphiphilic character. Preferably, the particles linked with hydrophilic and hydrophobic functional groups could be inorganics such as for example made of an oxide, hydroxide or oxy-hydroxide of at least one element chosen from lanthanides, such as cerium, post-transition metals, such as aluminium, transition metals, such as titanium and metalloids, such as silicon.

Hydrophilic functional groups may be neutral (—OH, —COOH, —PO$_3$H$_2$, —SO$_3$H as example) or preferentially under their anionic or cationic corresponding forms.

Hydrophobic groups could be organic chains having a hydrophobic nature. Said chains are defined as organic chains having a hydrophobic character such as these chains are soluble in a hydrophobic solvent and less soluble, notably insoluble, in water. Organic chains having a hydrophobic nature may have at least 50% wt, preferentially at least 80% wt of hydrophobic groups such as alkylated groups, or alkoxylated groups.

Hydrophobic groups are preferably alkyl chains comprising 1 to 30 carbon atoms, more preferably from 1 to 8 carbon atoms or alkoxylated groups notably comprising 1 to 10 units of ethylene oxide —CH$_2$CH$_2$O— groups.

The exact nature of the link existing between organic chains and the surface of the solid particles can vary in a large measure and may be for example a covalent bond, or physical adsorption more often including an electrostatic bond, an ionic bond and a hydrogen bond. Covalent bonds can be obtained by grafting or co-condensation.

The grafting rate of the particle surface by hydrophobic groups may be comprised between 5 and 90% of the original amount of hydroxyl groups, preferably between 30 and 70%. This grafting rate may be evaluated by a thermal decomposition of the particles and then calculate the amount of water formed during the decomposition. It is then possible to proceed to an extrapolation of the number of hydroxyl group.

In a preferred embodiment of the invention, the bonds between the organic chains of hydrophobic nature and the surface of the particles are covalent bonds. In this case, these are usually made covalent bonds between atoms of metal particles and organic chains, usually via oxygen atoms initially present in a hydroxyl metal group of the particle surface.

Preferably, the metal atom of these groups hydroxylated metal surface is an atom of silicon, aluminum, or titanium. In this case, the particles are formed at least partially of silicon oxide, oxy-hydroxide of aluminum and/or titanium oxide, this or these oxide (s) and/or oxy-hydroxide being at least this (s) on the surface. Thus, the particles can then be formed such oxide (s), hydroxide (s) and/or oxy-hydroxide (s) of chemical nature variable, having a surface layer of silicon oxide oxy-aluminum hydroxide and/or titanium oxide, made for example by after-treatment surface.

The organic chains covalently linked are generally introduced by this embodiment of the invention by condensation of a silanol group SiOH on the particle, according to the general reaction:

[particle]-M-OH+OH—Si[organic chain]→[particle]-M-O—Si-[organic chain]

wherein M is Si, Al or Ti.

In this case, the silanol group SiOH usually comes from the acid hydrolysis, neutral, or basic group of an alkoxysilane, for example acid hydrolysis of trimethoxyalkylsilane or triethoxyalkylsilane.

Whatever the exact nature of links implemented to ensure cohesion between the hydrophobic chains and the particle surface, it is preferred that the bonds between the chains and hydrophobic particles are inhomogeneously distributed on the surface of said particles, whereby said particles modified surface have a first area to overall hydrophilic nature and a second area to overall hydrophobic character.

It has to be noticed that according to the nature of hydrophilic and hydrophobic functions at the surface of particles, said amphiphilic solid particles may also act as emulsifier and also catalyst.

It is advantageous to choose the concentration of amphiphilic solid particles according to the invention to be greater than 0.005 wt %, particularly between 0.005 wt % and 15.000 wt % and more preferably from 0.01 wt % and 5.00 wt % based on the total weight of reaction medium.

It should be understood by the people having ordinary skill in the art that any polyoxometalate has catalytic activity for oxidizing sulfur compound could be used in present invention.

Non-limiting examples of polyoxometalate could notably be Keggin type polyoxometalates (POMs), including H$_3$PW$_x$Mo$_{12-x}$O$_{40}$ (x=1, 3 or 6), Cs$_{2.5}$H$_{0.5}$PW$_{12}$O$_{40}$ and $H_3PW_{12}O_{40}$ as described in Catalysis Today 149 (2010) 117-121. Preferable polyoxometalate is $H_3PW_{12}O_{40}$.

In one preferred embodiment, an amphiphilic polyoxometalates, such as vanadium (V)-substituted polyoxometalates $[C_{18}H_{37}N(CH_3)_3]_{3+x}$ $[PMo_{12-x}V_xO_{40}]$ (x=1, 2 or 3) described in China Petroleum Processing and Petrochemical Technology (2012), 14(1), 25-31 or $[C_n mim]_3PW_{12}O_{40}$ (n=4, 8 or 16) described in Journal of Molecular Catalysis A: Chemical (2015), 406, 23-30 may be used in present invention.

The amount of polyoxometalate employed in invented process is not particularly limited and depends on the source. The molar ratio of polyoxometalate to sulfur compound may be comprised from 1:200 to 1:20.

The oxidant of present invention could notably be chosen in the group consisting of organic peroxy acid, such as peracetic acid, organic peroxide, such as t-butyl hydrogen peroxide and norganic peroxide, such as hydrogen peroxide, a perborate, a persulfate and any combination thereof. Among these oxidants, hydrogen peroxide could be more preferable.

In a particular embodiment, the oxidant of present invention could oxidize at least 90% sulfur compounds in liquid composition.

The amount of oxidant employed in invented process is not particularly limited and depends on the source, especially the amount of sulfur compounds comprised. The molar ratio of oxidant to sulfur compound may be comprised from 1.5:1 to 30:1 and preferably from 2:1 to 5:1.

It can be advantageous that at least one alcohol could be introduced in reaction medium notably at the start of oxidation reaction. Said alcohol may notably be aliphatic alcohols, which may be chosen in the group consisting of methanol, ethanol, n-propanol, n-butanol, n-pentanol, n-hexanol, n-heptanol, n-octanol, n-nonanol, n-decanol and any combination thereof. Among these, methanol or ethanol is more preferable.

The amount of alcohol introduced in reaction medium at the start of oxidation reaction could be comprised from 0.5 wt % to 5.5 wt % with respect to total weight of reaction medium.

In a particular embodiment, the residual sulfur element in liquid composition after oxidation reaction may be comprised of at most 50 ppm and preferably from 25 to 45 ppm.

In present invention, most of oxidized sulfur compounds enter into aqueous phase after the oxidation reaction. In a preferred embodiment, an extraction step could be employed to extract the residual oxidized sulfur compounds from the liquid composition with an extraction solvent miscible with water after oxidation reaction.

The extraction solvent miscible with water present invention should have much better solubility for the oxidized sulfur compounds than any one of other components of liquid composition. The extracted oxidized sulfur compounds will go to aqueous phase and then be separated from liquid composition.

The extraction solvent may notably be some alcohols, such as aliphatic alcohols, which may be chosen in the group consisting of methanol, ethanol, n-propanol, 2-propanol, 1,3-propanediol, 1,5-pentanediol, 1,2-butanediol, 1,3-butanediol, 1,4-butanediol any combination thereof and also could be some acids, such as butyric acid, propanoic acid, acetic acid or formic acid. Other examples of extraction solvent are: acetonitrile, acetone, acetaldehyde.

The volume ratio of extraction solvent to liquid composition could be comprised from 1:1 to 1:10 and preferably from 1:3 to 1:5.

Economically, a particles separation step could be employed to separate amphiphilic solid particles from the reaction medium. The separation could be realized by all well-known ways, such as filtration or centrifugation. The obtained amphiphilic solid particles could be recycled and reused after being washed by some organic solvents, such as methanol or ethanol. The catalyst could be recycled for at least 10 times without loss of activity. This step could be alternatively employed before or after extraction solvent is added to the reaction medium.

Advantageously, the liquid medium obtained after extraction step and particles separation step may be further subject to a stationary step for standing the liquid medium to provide an aqueous phase comprising the extracted oxidized sulfur compound and a liquid composition phase.

Additionally, a liquid separation step for separating the aqueous phase from the liquid composition phase could follow the stationary step.

In a specific embodiment, the process for removing sulfur compounds from a liquid composition immiscible with water, comprising:
(i) at least partially oxidizing the sulfur compounds by contacting the liquid composition comprising at least one sulfur compound with an aqueous oxidizing solution comprising at least one oxidant in the presence of at least one polyoxometalate and amphiphilic solid particles;
(ii) extracting the oxidized sulfur compounds from the liquid composition with an extraction solvent miscible with water;
(iii) separating amphiphilic solid particles from the liquid medium obtained at step (ii);
(iv) standing the liquid medium obtained at step (iii) to provide an aqueous phase comprising the extracted oxidized sulfur compound and a liquid sulfur-free composition phase; and
(v) separating the aqueous phase from the liquid sulfur-free composition phase.

The invention also concerns a composition susceptible to be obtained by invented process comprising:
a) a liquid composition immiscible with water comprising at least one sulfur compound;
d) at least one polyoxometalate and amphiphilic solid particles;
e) an aqueous oxidizing solution comprising at least one oxidant.

The following examples are included to illustrate embodiments of the invention. Needless to say, the invention is not limited to the described examples.

EXPERIMENTAL PART

Example 1

Preparation of Functionalized Silica Particles

Silica (3 g, aerosil 200) was first treated at 120° C. under vacuum for 2 h. After cooling down to room temperature, cyclohexane (50 ml, pre-dried with zeolite 4A) was added and stirred until a colloidal suspension was formed. Then, trimethoxy(octyl)silane (19.92 mmol, 4.6726 g, 5.1517 ml) was added under $N_2$ atmosphere under mild stirring. The final suspension was heated to 40° C. for 30 min to dissolve the silane, and subsequently under reflux (80° C.) during 16 h for reaction with surface silanol groups. After this period, the suspension was cooled down to room temperature and centrifuged to remove the organic solution. The obtained functionalized silica solids were washed with cyclohexane (3×50 ml) and ethanol (3×50 ml) to remove unreacted residues. The final solid was dried in an oven overnight at 100° C. before use.

Example 2

Oxidation of Model Sulfur-Containing Compounds with Functionalized Silicas

In a typical procedure, aromatic organic sulfur compound, benzothiophene (BT), was dissolved into decalin to simulate oil (labelled as model oil) in 1000 mg mL$^{-1}$ (1000 ppm), respectively. $H_3PW_{12}O_{40}$ (0.03 g), functionalized silica (0.0150 g) and $H_2O_2$ (30 wt. %, 252 µl, $H_2O_2$:S=4 molar ratio) were added into a flask to stir for 3 minutes. And then, the model oil (20 ml, BT of 1000 ppm) was introduced to the flask. The above mixture was placed in a preheated oil bath at 60° C. and stirred at 800 rpm for 4 hours. Then, the reaction was stopped by cooling in the ice chamber. The upper organic phase was analyzed by GC to determine the sulfur content. Residual BT in organic phase was 22% and therefore BT conversion was 78%. The selectivity of sulfone in aqueous phase was 100% as analyzed by GC.

Example 3

Oxidation of Model Sulfur-Containing Compounds with Silicas

In a typical procedure, aromatic organic sulfur compound, benzothiophene (BT), was dissolved into decalin to simulate oil (labelled as model oil) in 1000 mg mL-1 (1000 ppm), respectively. $H_3PW_{12}O_{40}$ (0.03 g), amphiphilic silica (0.0150 g, aerosil 200)) and $H_2O_2$ (30 wt. %, 1638 µl, $H_2O_2$:S=26 molar ratio) were added into a flask to stir for 3 minutes. And then, the model oil (20 ml, BT of 1000 ppm) was introduced to the flask. The above mixture was placed in a preheated oil bath at 60° C. and stirred at 800 rpm for 4 hours. Then, the reaction was stopped by cooling in the ice chamber. The upper organic phase was analyzed by GC to determine the sulfur content. Residual BT in organic phase was 45% and therefore BT conversion was 55%. The selectivity of sulfone in aqueous phase was 100% as analyzed by GC.

Comparative Example 1

Oxidation of Model Sulfur-Containing Compounds without Addition of Silicas

In a typical procedure, aromatic organic sulfur compound, benzothiophene (BT), was dissolved into decalin to simulate oil (labelled as model oil) in 1000 mg mL$^{-1}$ (1000 ppm), respectively. $H_3PW_{12}O_{40}$ (0.03 g) and $H_2O_2$ (30 wt. %, 252 µl, $H_2O_2$:S=4 molar ratio) were added into a flask to stir for 3 minutes. And then, the model oil (20 ml, BT of 1000 ppm) was introduced to the flask. The above mixture was placed in a preheated oil bath at 60° C. and stirred at 800 rpm for 4 hours. Then, the reaction was stopped by cooling in the ice chamber. The upper organic phase was analyzed by GC to determine the sulfur content. Residual BT in organic phase was 98% and therefore BT conversion was 2%. The selectivity of sulfone in aqueous phase was 100% as analyzed by GC.

Example 4

Oxidation of Model Sulfur-Containing Compounds with Addition of Alcohol

The oxidation of model sulfur-containing compounds is run according to the same procedure as Example 2 except that alcohol was added into reaction. Methanol and Ethanol in different volumes, $H_3PW_{12}O_{40}$ (0.03 g), functionalized silica (0.0150 g) and $H_2O_2$ (30 wt. %, 252 µl, $H_2O_2$:S=2, 2.5, 3, 4 molar ratio) were added into a flask to stir for 3 minutes. And then, the model oil (20 ml, BT of 1000 ppm) was introduced to the flask. The above mixture was placed in a preheated oil bath at 60° C. and stirred at 800 rpm for 4 hours. Then, the reaction was stopped by cooling in the ice chamber. The upper organic phase was analyzed by GC to determine the sulfur content. BT conversion is shown in Table 1.

TABLE 1

| No. | $H_2O_2$/S | alcohol/µl | BT conv. (Ethanol) | BT conv. (Methanol) |
|---|---|---|---|---|
| 1 | 4 | 150 | 95.9% | 95.3% |
| 2 | 3 | 150 | 87.7% | 83.9% |
| 3 | 2.5 | 150 | 82.2% | 80.1% |
| 4 | 2.5 | 250 | 93.0% | 80.6% |
| 5 | 2.5 | 400 | 95.3% | 96.0% |
| 6 | 2 | 150 | 72.4% | 69.0% |
| 7 | 2 | 250 | 79.2% | 70.5% |
| 8 | 2 | 400 | 84.2% | 84.5% |

Reaction Condition: reaction at 60° C. for 4 hours under 1 atm, stir at 800 rpm, $H_3PW_{12}O_{40}$: 0.03 g, model oil prepared of BT (benzothiophene) in decalin (S=1000 ppm, 20 ml).

Example 5

Recyclability of Functionalized Silica Particles $H_3PW_{12}O_{40}$ (0.03 g), functionalized silica (0.0689 g) and $H_2O_2$ (30 wt. %, 630 µl, $H_2O_2$:S=10 molar ratio) were added into a flask to stir for 3 minutes. And then, the model oil (20 ml, BT of 1000 ppm or DBT of 1000 ppm) was introduced to the flask. The above mixture was placed in a preheated oil bath at 70° C. and stirred at 800 rpm for 4 hours. Then, the reaction was stopped by cooling in the ice chamber. After ethanol extraction and centrifugation, the silica particles were separated from the reaction system. Then ethanol was added to wash silica particles, after centrifugation, silica particles were recovered from reaction system. This procedure was repeated in another twice in order to remove organic compounds from silicas. Then recovered silicas were added to reaction system following the procedure described above. The recyclability of silica particles is shown in Table 2.

TABLE 2

| Cycle index. | Conv. of BT |
|---|---|
| Feed | 99.6% |
| 1 | 98.4% |
| 2 | 99.5% |
| 3 | 93.6% |
| 4 | 99.3% |

Reaction Condition: reaction at 70° C. for 4 hours under 1 atm, stir at 800 rpm, $H_3PW_{12}O_{40}$: 0.03 g, $H_2O_2$ (30 wt. %): 630 µl ($H_2O_2$/S=10 molar ratio), functionalized silica:

0.0689 g, model oil prepared of BT (benzothiophene) in decalin (S=1000 ppm, 20 ml).

The invention claimed is:

1. A process for removing at least one sulfur compound from a liquid composition that is immiscible with water and that comprises the at least one sulfur compound, comprising at least partially oxidizing the at least one sulfur compound by contacting the liquid composition with an aqueous oxidizing solution comprising at least one oxidant in the presence of at least one polyoxometalate and amphiphilic solid particles, wherein there is no linkage between the at least one polyoxometalate and the amphiphilic solid particles.

2. The process according to claim 1, wherein the amphiphilic solid particles comprise solid particles of an oxide, hydroxide, or oxy-hydroxide of at least one element chosen from cerium, aluminum, titanium, and silicon.

3. The process according to claim 1, wherein the amphiphilic solid particles comprise hydrophilic functional groups and hydrophobic functional groups.

4. The process according to claim 3, wherein hydrophilic functional groups are selected from the group consisting of —OH, —COOH, —PO$_3$H$_2$, and —SO$_3$H.

5. The process according to claim 3, wherein hydrophobic functional groups are selected from the group consisting of alkyl chains comprising 1 to 30 carbon atoms and alkoxylated groups.

6. The process according to claim 3, wherein the particles comprising the hydrophilic functional groups and hydrophobic functional groups are inorganic particles comprising an oxide, hydroxide, or oxy-hydroxide of at least one element chosen from cerium, aluminum, titanium and silicon.

7. The process according to claim 1, wherein amphiphilic solid particles have an average diameter of from 100 to 3000 nm.

8. The process according to claim 1, wherein the amphiphilic solid particles are present in a concentration of from 0.01 wt % to 5.00 wt %, based on the total weight of the liquid composition that is immiscible with water and that comprises the at least one sulfur compound, the aqueous oxidizing solution comprising at least one oxidant, the at least one polyoxometalate and amphiphilic solid particles.

9. The process according to claim 1, wherein the liquid composition comprises at least one sulfur compound, at least one sulfur-free organic compound, and, optionally, at least one inorganic compound.

10. The process according to claim 1, wherein the liquid composition comprises fuel oil.

11. The process according to claim 1, wherein sulfur compound is selected from the group consisting of benzothiophene, dibenzothiophene, and 4,6-dimethyldibenzothiophene.

12. The process according to claim 1, wherein the polyoxometalate is a Keggin type polyoxometalate.

13. The process according to claim 1, wherein at least one alcohol is introduced in the liquid composition that is immiscible with water and that comprises the at least one sulfur compound, the aqueous oxidizing solution comprising at least one oxidant, the at least one polyoxometalate and amphiphilic solid particles at the start of oxidation reaction.

14. The process according to claim 13, wherein the alcohol comprises one or more aliphatic alcohols chosen in the group consisting of methanol, ethanol, n-propanol, n-butanol, n-pentanol, n-hexanol, n-heptanol, n-octanol, n-nonanol, n-decanol, and any combination thereof.

15. The process according to claim 14, wherein the amount of alcohol introduced is from 0.5 wt % to 5.5 wt % with respect to total weight of the liquid composition that is immiscible with water and that comprises the at least one sulfur compound, the aqueous oxidizing solution comprising at least one oxidant, the at least one polyoxometalate, amphiphilic solid particles and the alcohol.

16. A process for removing sulfur compounds from a liquid composition that is immiscible with water and that comprises at least one sulfur compound, comprising:
(i) at least partially oxidizing the at least one sulfur compound by contacting the liquid composition with an aqueous oxidizing solution comprising at least one oxidant in the presence of at least one polyoxometalate and amphiphilic solid particles, wherein there is no linkage between the at least one polyoxometalate and the amphiphilic solid particles;
(ii) extracting oxidized sulfur compounds from the liquid composition with an extraction solvent that is miscible with water;
(iii) separating amphiphilic solid particles from the liquid medium obtained at step (ii);
(iv) letting the liquid medium obtained at step (iii) stay still to provide an aqueous phase comprising the extracted oxidized sulfur compound and a liquid sulfur-free composition phase; and
(v) separating the aqueous phase from the liquid sulfur-free composition phase.

17. A composition, comprising:
a liquid composition that is immiscible with water and that comprises at least one sulfur compound;
at least one polyoxometalate and amphiphilic solid particles, wherein there is no linkage between the at least one polyoxometalate and the amphiphilic solid particles; and
an aqueous oxidizing solution comprising at least one oxidant.

18. The process according to claim 5, wherein alkyl chains comprise from 1 to 8 carbon atoms per chain.

19. The process according to claim 5, wherein alkoxylated groups comprise from 1 to 10 ethylene oxide units per group.

20. The process according to claim 12, wherein the polyoxometalate is H$_3$PW$_{12}$O$_{40}$.

* * * * *